US012638287B2

(12) United States Patent
McSchooler

(10) Patent No.: US 12,638,287 B2
(45) Date of Patent: May 26, 2026

(54) EMERGENCY RESPONSE LOCATION DETECTION

(71) Applicant: DISH WIRELESS L.L.C., Englewood, CO (US)

(72) Inventor: Jeffrey McSchooler, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 501 days.

(21) Appl. No.: 18/132,884

(22) Filed: Apr. 10, 2023

(65) Prior Publication Data

US 2024/0337485 A1     Oct. 10, 2024

(51) Int. Cl.
*H04W 4/029* (2018.01)
*G01C 5/06* (2006.01)
*H04W 4/90* (2018.01)

(52) U.S. Cl.
CPC .............. *G01C 5/06* (2013.01); *H04W 4/029* (2018.02); *H04W 4/90* (2018.02)

(58) Field of Classification Search
CPC ....... H04W 4/029; H04W 4/90; H04W 4/023; H04W 4/33; H04W 4/38; H04W 4/025; G01C 5/06; G01S 5/02526; G01S 5/0264; G01S 2205/06; H04L 67/10
See application file for complete search history.

(56) References Cited

U.S. PATENT DOCUMENTS

2018/0031388 A1* 2/2018 Gunnarsson .......... H04W 4/029
2020/0351623 A1* 11/2020 Eisner ..................... H04W 4/80

FOREIGN PATENT DOCUMENTS

WO       2013/101005 A1     7/2013
WO       2021/250525 A1     12/2021

OTHER PUBLICATIONS

International Search Report and Written Opinion received for PCT Patent Application No. PCT/US24/19780, mailed on May 30, 2024, 7 pages.

* cited by examiner

*Primary Examiner* — Marcos L Torres
(74) *Attorney, Agent, or Firm* — Kipman T. Werking; Frontier IP Law PLLC

(57) ABSTRACT

A disclosed method may include (i) detecting, from a first sensor at a first user equipment, a vertical height of the first user equipment, (ii) detecting, from the first user equipment, a request for emergency services directed to an emergency response service, (iii) detecting an indication that a second user equipment is located within a network vicinity of the first user equipment, and (iv) improving an accuracy of detecting the vertical height of the first user equipment by adjusting the detected vertical height of the first user equipment based on a detected vertical height from a second sensor at the second user equipment. Related systems and computer-readable mediums are further disclosed.

18 Claims, 8 Drawing Sheets

100

Start

Detect, from a first sensor at a first user equipment, a vertical height of the first user equipment
102

Detect, from the first user equipment, a request for emergency services directed to an emergency response service
104

Detect an indication that a second user equipment is located within a network vicinity of the first user equipment
106

Improve an accuracy of detecting the vertical height of the first user equipment by adjusting the detected vertical height of the first user equipment based on a detected vertical height from a second sensor at the second user equipment
108

End

100

200

700

EMERGENCY RESPONSE LOCATION DETECTION

BRIEF SUMMARY

This application is generally directed to emergency response location detection, as discussed in more detail below. In one example, a method may include (i) detecting, from a first sensor at a first user equipment, a vertical height of the first user equipment, (ii) detecting, from the first user equipment, a request for emergency services directed to an emergency response service, (iii) detecting an indication that a second user equipment is located within a network vicinity of the first user equipment, and (iv) improving an accuracy of detecting the vertical height of the first user equipment by adjusting the detected vertical height of the first user equipment based on a detected vertical height from a second sensor at the second user equipment.

In some examples, the sensor comprises a barometric pressure sensor.

In some examples, the barometric pressure sensor indicates the vertical height of the first user equipment based on correlating an output of the barometric pressure sensor with output of a third-party barometric sensor at a predetermined vertical height.

In some examples, improving the accuracy based on the detected vertical height of the second user equipment enables measurement of the vertical height to satisfy a safety mandate.

In some examples, the accuracy is further improved by adjusting the detected vertical height of the first user equipment based on a detected vertical height from a third sensor at a third user equipment.

In some examples, detecting the indication that the second user equipment is located within the network vicinity of the first user equipment comprises detecting that the first user equipment and the second user equipment can directly reach each other over a wireless connection.

In some examples, detecting the indication that the second user equipment is located within the network vicinity of the first user equipment comprises detecting that the first user equipment and the second user equipment are connected to the same network access point.

In some examples, the method further comprises receiving the detected vertical height of the first user equipment in response to the request for emergency services directed to the emergency response service.

In some examples, the method further comprises crowdsourcing a multitude of detected vertical heights from different instances of user equipment by aggregating them at a backend server of a cellular service provider.

In some examples, the accuracy is further improved by adjusting the detected vertical height of the first user equipment based on a value in a PIDF-LO tag.

In some examples, a corresponding system may include at least one processor and at least one memory coupled to the at least one processor, the at least one memory having computer-executable instructions stored thereon that, when executed by the at least one processor, cause actions to be performed, the actions including: (i) detecting, from a first sensor at the first user equipment, a vertical height of the first user equipment, (ii) detecting, from the first user equipment, a request for emergency services directed to an emergency response service, (iii) detecting an indication that the second user equipment is located within a network vicinity of the first user equipment, and (iv) improving an accuracy of detecting the vertical height of the first user equipment by adjusting the detected vertical height of the first user equipment based on a detected vertical height from a second sensor at the second user equipment.

In some examples, a non-transitory computer-readable medium can encode instructions that, when executed by at least one physical processor of a computing device, cause the computing device to perform a method comprising: (i) detecting, from a first sensor at a first user equipment, a vertical height of the first user equipment, (ii) detecting, from the first user equipment, a request for emergency services directed to an emergency response service, (iii) detecting an indication that a second user equipment is located within a network vicinity of the first user equipment, and (iv) improving an accuracy of detecting the vertical height of the first user equipment by adjusting the detected vertical height of the first user equipment based on a detected vertical height from a second sensor at the second user equipment.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
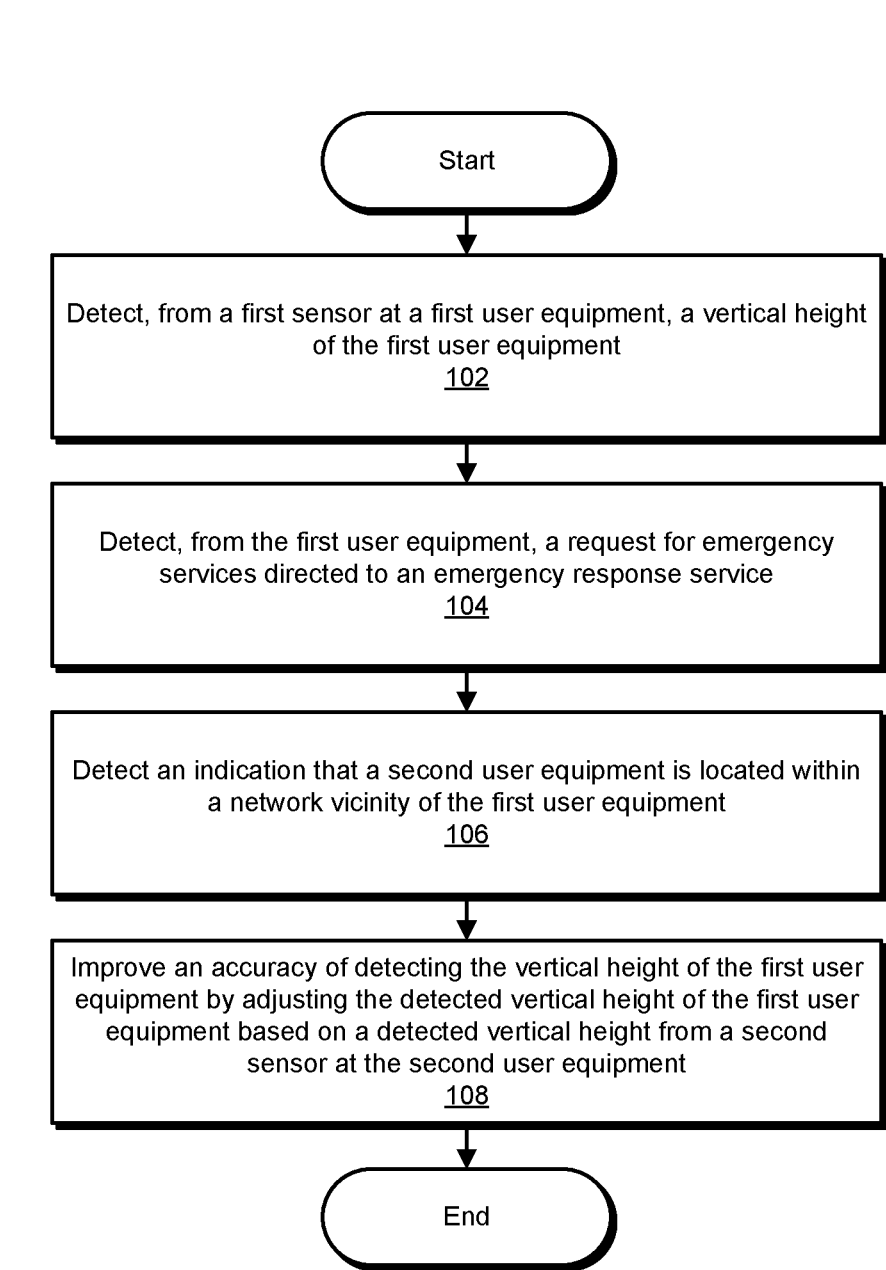
FIG. 1 shows a flow diagram for an example method for emergency response location crowdsourcing.

FIG. 1 shows a flow diagram 100 for a method for emergency response location crowdsourcing. At step 102, one or more of the systems described herein may detect, from a first sensor at a first user equipment, a vertical height of the first user equipment. At step 104, one or more of the systems described herein may detect, from the first user equipment, a request for emergency services directed to an emergency response service. At step 106, one or more of the systems described herein may detect an indication that a second user equipment is located within a network vicinity of the first user equipment. Lastly, at step 108, one or more of the systems described herein may improve an accuracy of detecting the vertical height of the first user equipment by adjusting the detected vertical height of the first user equipment based on a detected vertical height from a second sensor at the second user equipment. The steps of method 100 and the details of various embodiments are discussed in more detail below in connection with FIGS. 2-7.

Figure 2:
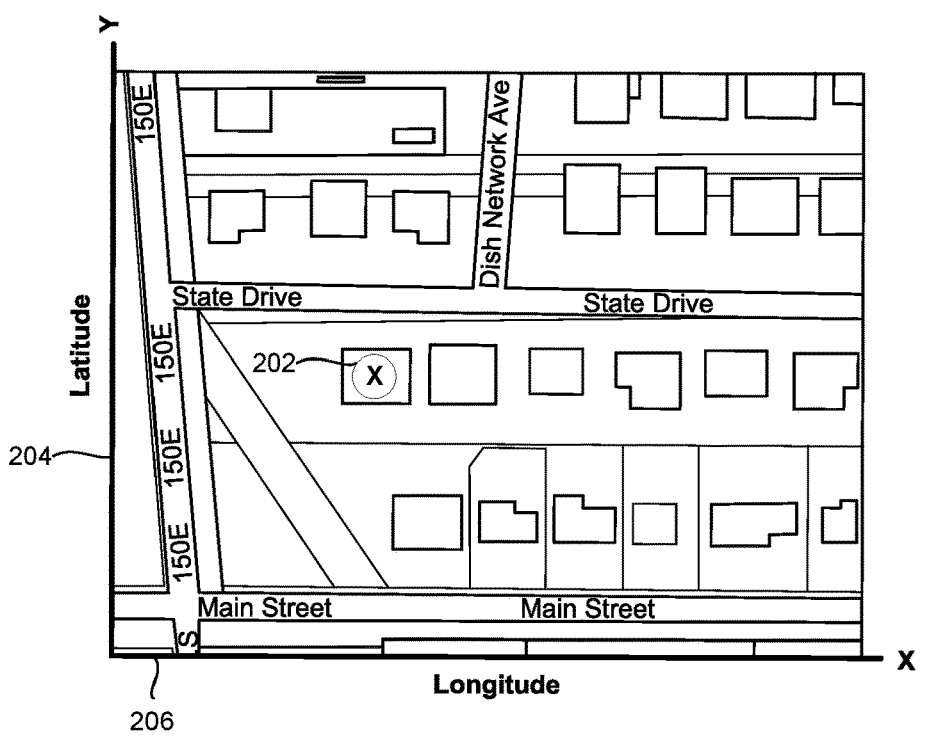
FIG. 2 shows a diagram for an example longitudinal and latitudinal coordinate location system in connection with emergency response services.

Some emergency response location systems may provide longitudinal and latitudinal coordinates to a predetermined level of accuracy to thereby assist emergency response services in locating, and responding to, individuals experiencing a medical, criminal, or other emergency. FIG. 2 shows an example diagram 200 of streets and buildings, which are situated along an X axis 204 and a Y axis 206. In this particular example, a building 202 has been identified through latitudinal and longitudinal geolocation coordinates, as indicated by an X sign. According to these emergency response location systems, an individual experiencing an emergency, such as a heart attack, can use the individual's client device or user equipment (e.g., a smartphone) to request emergency response services. For example, the user may use his or her smartphone to dial an emergency response line, such as 911, to request an emergency response. In some examples, the user's client device may provide functionality whereby the client device provides, as part of the request for emergency services, information indicating the location of the user's current whereabouts. Providing information regarding the user's current whereabouts may thereby assist the emergency response service in locating, and furthermore reaching, the user in order to provide the requested assistance. In some examples, the client device may provide the location information with assistance from the user himself or herself. In other examples, the client device may provide location information automatically, such as by providing the information as part of a background process. In such examples, the client device may be intelligent enough to provide the location information autonomously such that the user experiencing an emergency is not further bothered or hassled with providing that information.

Additionally, some institutions or organizations may actually enforce a safety mandate that requires the client device to provide such location information and/or to provide location information to a predetermined and mandated level of accuracy. For example, certain governments may mandate that the client device provides location information up to a level of accuracy that is defined in terms of a predefined threshold of meters. As one illustrative example, certain governments may mandate that the client device provides longitudinal and latitudinal coordinates that are accurate or precise within three meters. In the example of FIG. 2, such precise and accurate coordinates on both axes may enable the emergency response services to pinpoint the location of the individual experiencing the emergency to a particular address or building, such as any of the buildings shown within this figure. In further examples, location coordinates that are sufficiently accurate or precise may enable emergency response services to locate, and respond to, individuals within a particular sub-location within the same building or address.

In addition to the longitudinal and latitudinal coordinates discussed above in connection with FIG. 2, some emergency response location systems may furthermore provide vertical coordinate or height location information, thereby assisting the emergency response services in locating not just the particular address or building where an individual is located, but also which particular floor the user is located at, for example. The usage of vertical height information becomes even more important in the context of urban environments that contain skyscrapers or other tall buildings such that the emergency response services benefit from the vertical height information. In other words, the usage of vertical height information may enable the emergency response services to more quickly identify, and respond to, individuals who are experiencing an emergency, by enabling the services to more quickly and directly navigate to the particular floor where the user is located.

Figure 3:
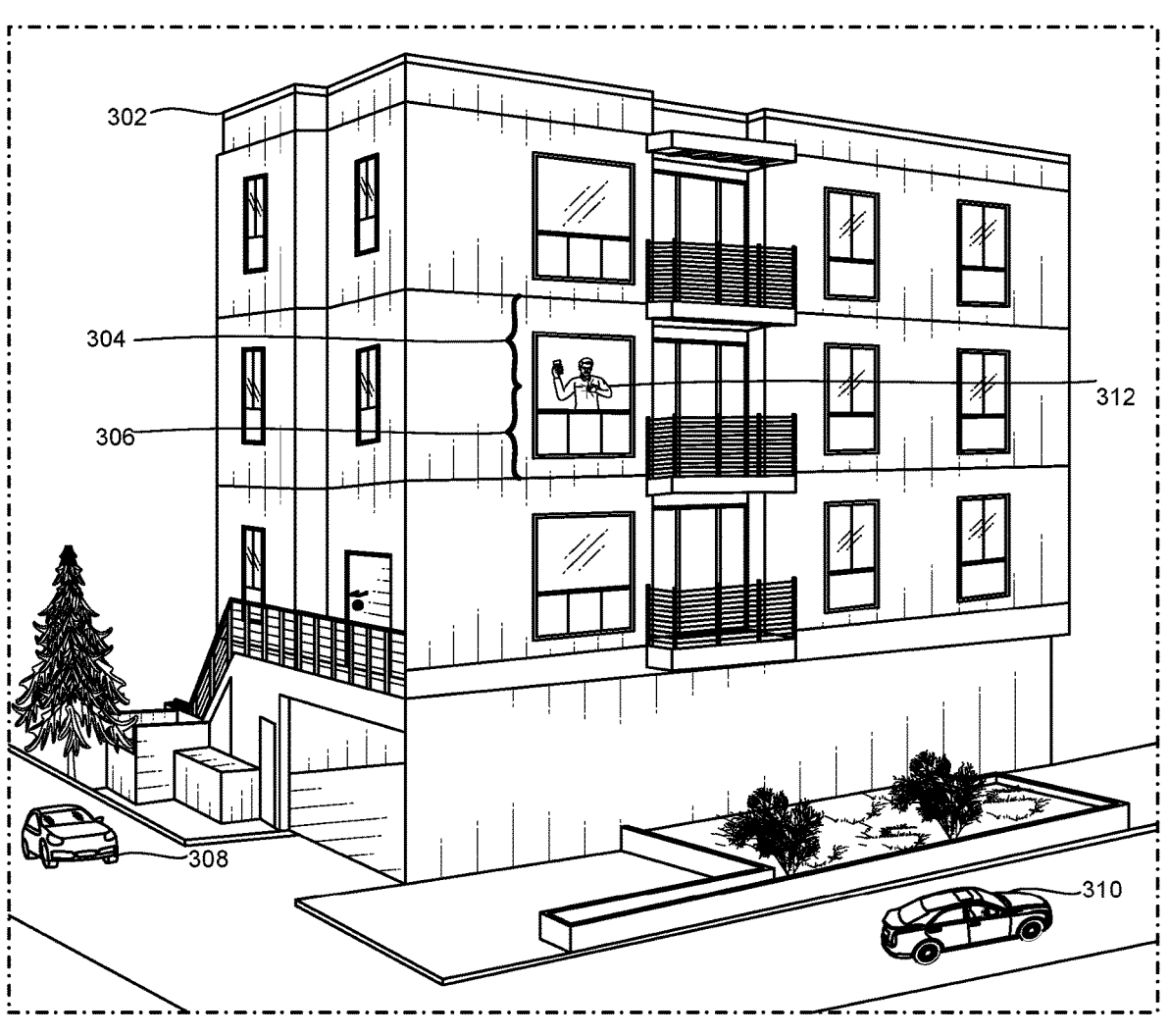
FIG. 3 shows a diagram illustrating how a smartphone may need to provide a level of accuracy of a vertical height for emergency response services.

FIG. 3 shows a diagram that helps to illustrate the usage of vertical or height information to assist emergency response services in locating, and responding to, an individual who is experiencing an emergency. As further shown in this figure, the diagram may show an apartment building 302, and outside of the apartment building may be a car 308 and a car 310. The apartment building may include a garage floor on the bottom, and may further include three additional floors of apartments above the garage floor. Within the middle of the three additional floors of apartments, an individual 312 may be clutching his chest because the individual is experiencing a heart attack. At the same time, the individual may be holding a smartphone with the other hand, because the individual is calling an emergency response line such as 911. In the example of this figure, the individual is manually triggering and dialing the emergency response line. In other examples, however, the smartphone or other client device may be intelligent enough to detect an emergency and, in response, autonomously call the emergency response line itself.

FIG. 3 also further shows a curly bracket 304 and a curly bracket 306, which help to illustrate the application of a safety mandate in terms of vertical coordinate information accuracy or precision. In particular, certain institutions, organizations, and/or governments may mandate that the vertical information provided by the client device satisfies a particular threshold of accuracy. As one illustrative example, a government might mandate that the client device provide accuracy or precision of locating the vertical height of the client device to within 1.5 meters. Accordingly, curly bracket 304 and curly bracket 306 might span 1.5 meters each in order to visually represent a vertical spectrum along which the detected vertical height needs to be found in order to satisfy this particular safety mandate. In other words, the actual vertical height of the client device would need to be, according to the safety mandate, within 1.5 meters up or down of the detected vertical height.

Figure 4:
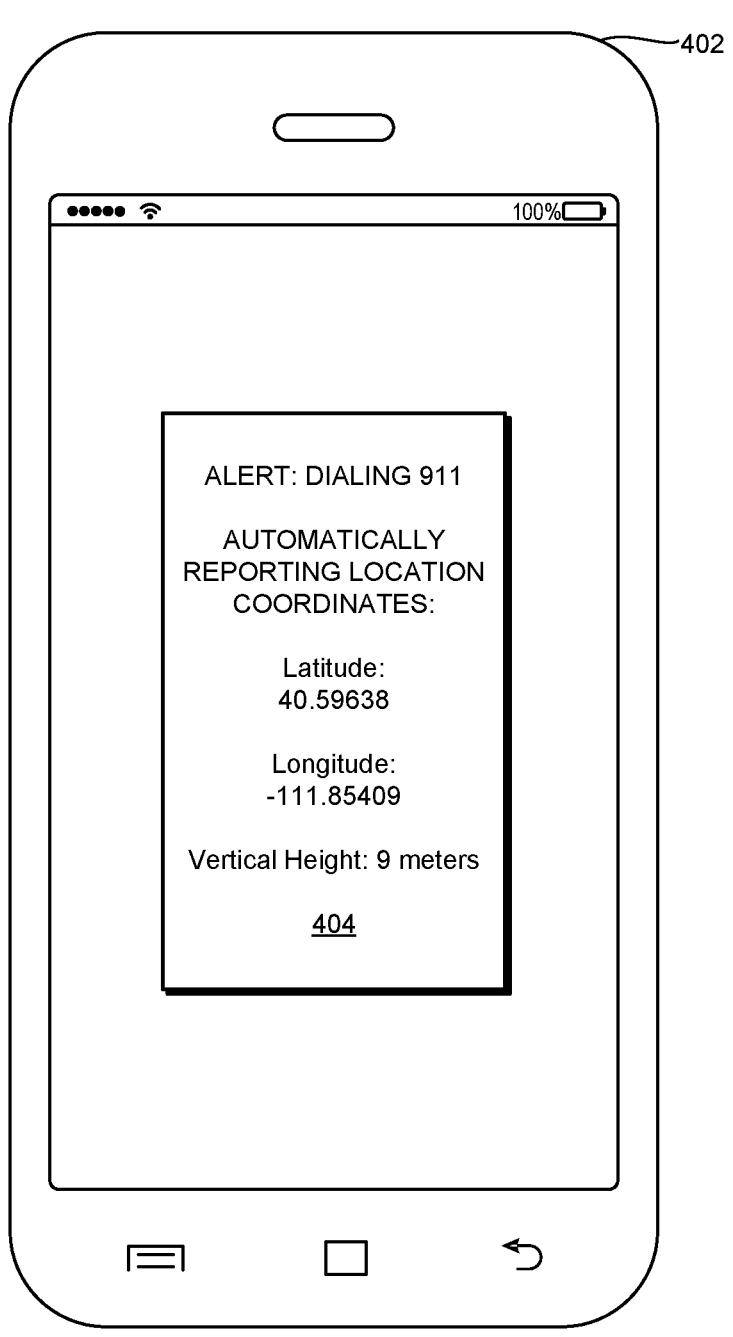
FIG. 4 shows a diagram of a smartphone graphical user interface.

FIG. 4 shows an example of a smartphone 402 that optionally displays information to the user experiencing the emergency regarding the reporting of the emergency to emergency response services, as well as optional information indicating the detected location of the individual along three separate coordinates, as further discussed above. Accordingly, smartphone 402 may have a graphical user interface 404 that indicates to the user that the request to the emergency response line has been received and is being acted upon. Additionally, graphical user interface 404 further reports the specific geolocation coordinates along the latitude, longitude, and vertical height axes. In the example of this figure, the location of the individuals reported in terms of geolocation latitudinal and longitudinal coordinates, as well as a vertical height in meters. In other examples, additionally or alternatively, one or more of these coordinates may be reported in terms of a street address, street intersection, building identifier, or other location identifier, etc. For example, the vertical height may be reported in terms of feet rather than meters. In various examples, one or more of these location identifiers may be translated into another identifier, which may potentially be more useful or more readily understandable by the emergency response service. For example, the emergency response system of this application may be configured to intelligently translate geolocation latitudinal and longitudinal coordinates into a street address. Similarly, the system may be intelligent enough to translate a vertical height in meters into a particular floor of a multistory building (e.g., "the individual expensing the emergency is located on the $14^{th}$ floor for this particular skyscraper at address XYZ").

In various embodiments, the technology of this application may improve upon one or more of the systems described above by leveraging, or crowdsourcing, one or more additional instances of a client device reporting a detected vertical height when the additional instance is within a particular vicinity, or a network vicinity, of the individual expensing the emergency.

Figure 5:
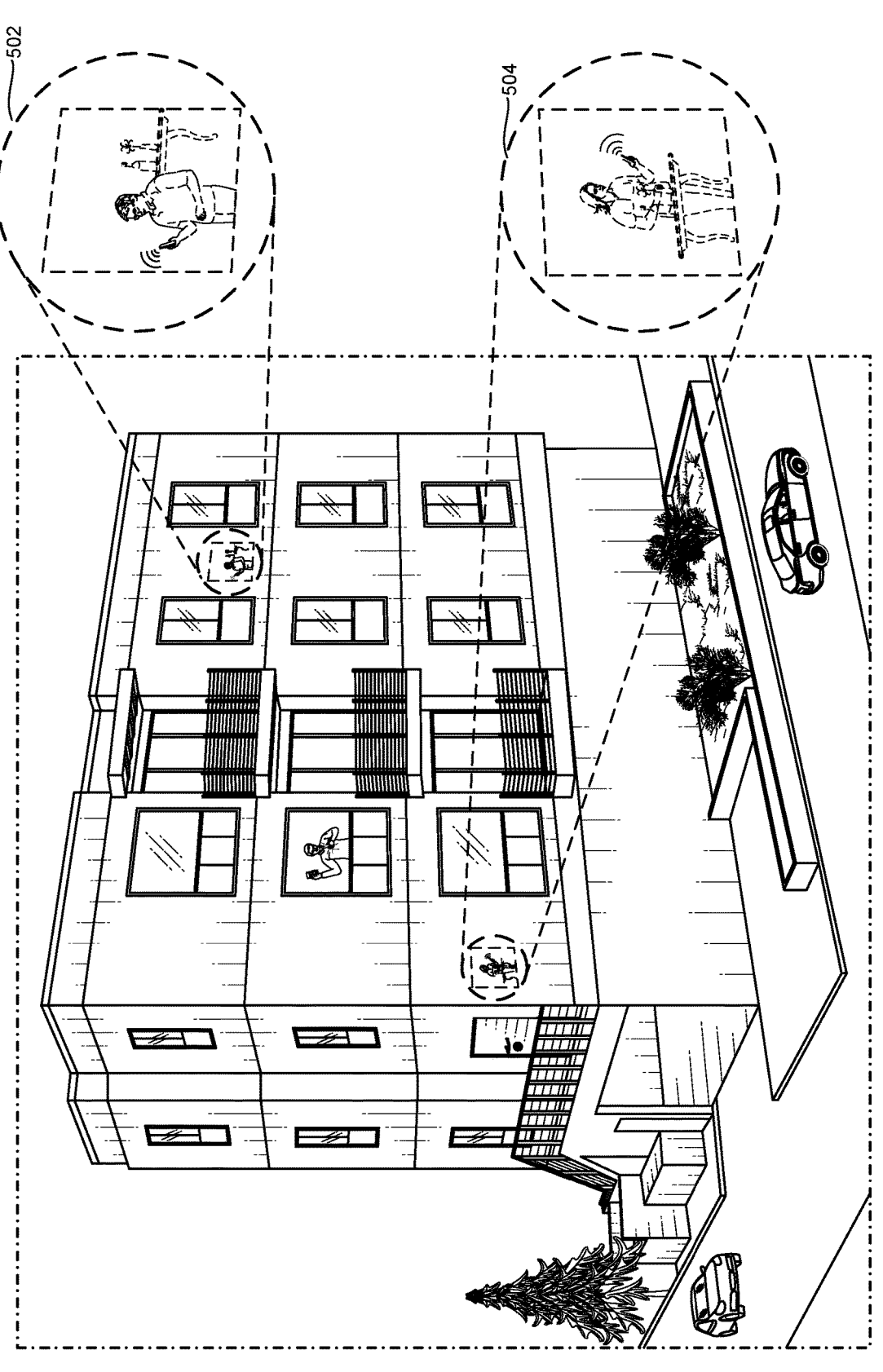
FIG. 5 shows a diagram illustrating the crowdsourcing of vertical height information for the benefit of emergency response services.

FIG. 5 shows an updated version of the diagram of FIG. 3, which further includes a callout 502 and a callout 504. Callout 502 and callout 504 illustrate how to additional individuals may also be using instances of user equipment (e.g., smartphones, tablets, computers, etc., which may be connected to the same or different network or cellular service). Accordingly, consistent with step 108 of method 100, the detected accuracy of the vertical height for the individual on the middle floor experiencing the heart attack may be improved by leveraging, or factoring in, the reported detected height of the instances of user equipment shown in callout 502 and callout 504.

Using one or more additional instances of user equipment reporting the detected height can be helpful due to the fact that the vertical sensors within certain smartphones, etc., can suffer from certain limitations in terms of precision or accuracy. For example, although a particular smartphone might report a detected vertical height of five meters, the actual height might be one meter or nine meters (as two illustrative examples of arbitrary errors in either direction of up or down). The deficiencies of such vertical height sensors can vary dramatically between different types of user equipment (e.g., between different models or manufacturers of smartphones), and can vary due to differential costs. For example, less expensive vertical height sensors costing pennies may be dramatically less accurate than more extensive vertical height sensors that cost approximately a dollar or more. The various limitations of these different sensors can impede or prevent the satisfaction of a safety mandate, such as a safety mandate from a government entity to ensure accuracy within a threshold distance of vertical height (e.g., three meters).

In the example of FIG. 5, all three individuals corresponding to the three separate floors of the apartment building might be connected to the same wireless router or access point. Additionally, or alternatively, one or more pairs of these individuals might be directly reachable between each other over a wireless connection, such as a Bluetooth connection. For example, one individual's client device might detect a probe or broadcast message from another individual's client device, thereby indicating that the two client devices are reachable between each other, even without forming a network connection. Additionally, or alternatively, the two client devices might form a network connection between each other. In other examples, two or more client devices may be connected physically, rather than wirelessly, to the same network, where that network is configured such that a useful degree of proximity can be inferred between the two or more client devices. This would happen, for example, in the case of a local area network wired connection, where the local area network is limited to a particular location, address, building, premises, corporate headquarters, etc. All of the examples above help illustrate the meaning of the term "network vicinity" used in step 106 of method 100.

Figure 6:
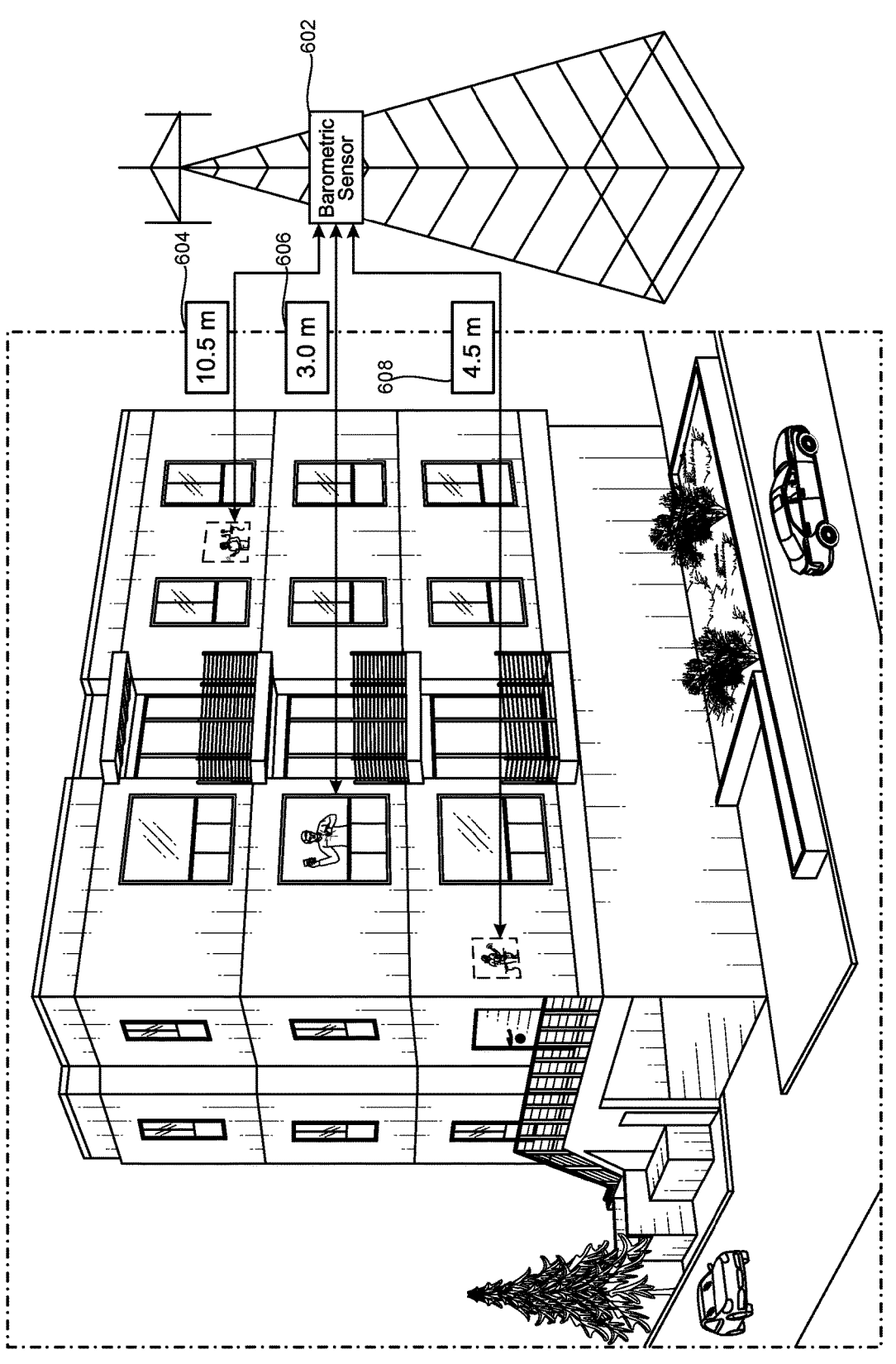
FIG. 6 shows a diagram illustrating a mechanism for detecting vertical height using barometric pressure sensors.

Turning to FIG. 6, this figure shows a diagram whereby the client device on the top floor is reporting a detected vertical height of 10.5 m (corresponding to indicator 604 in this figure), the client device for the individual experiencing the heart attack on the middle floor is reporting a detected vertical height of 3.0 m (corresponding to indicator 606 in this figure), and the client device for the individual on the first floor is reporting a detected vertical height of 4.5 m (corresponding to indicator 608 in this figure). Nevertheless, in this simplified example for illustrative purposes, the actual real world vertical height of the client device on the middle floor is exactly 7.5 m rather than 7.0 m. The significant error in the detected vertical height for the client device on the middle floor may be due to the fact that the corresponding smartphone uses a significantly less expensive, and less accurate, vertical height sensor than the vertical height sensors used in the additional client devices shown in this figure, as further discussed above.

In view of the above, the emergency response technology of this application can, in various embodiments, intelligently adjust the detected vertical height of the client device in the middle floor by leveraging, or crowdsourcing, one or more of the other instances of detected vertical height shown in this figure. For example, the emergency response technology of this application can detect that the client device on the top floor and the client device in the bottom floor is within the same network vicinity of the person experiencing the heart attack, due to the fact that, for example, all three client devices are connected to the same wireless access point. Accordingly, the emergency response technology can, in this simplified example, take the average of 10.5 m and 4.5 m as 7.5, which actually coincides with the real world vertical height of the client device for the individual experiencing the heart attack. Subsequently, the emergency response technology can adjust the detected vertical height of 3.0 m, based on the calculated average of 7.5 m, thereby bringing the estimated and adjusted vertical height closer to 7.5 m (e.g., 5.25 m=(3.0 m+7.5 m)/2), improving the overall accuracy of the system and thereby improving the emergency response time, and potentially saving minutes or saving lives when responding to corresponding emergencies. For example, in certain scenarios the leveraging or crowdsourcing of vertical height information might correct an incorrectly detected floor of a skyscraper or other tall building, preventing emergency response services from wasting precious time navigating to the wrong floor first (e.g., by correcting the detected floor from the first floor to the second floor).

FIG. 6 also further illustrates how one or more of the vertical sensors discussed above may correspond to a barometric pressure sensor. As an individual moves up or down vertically at a sufficient threshold distance, the corresponding atmospheric pressure changes. Moreover, the overall atmospheric pressure for the geographic location in which the individual is located can change throughout the day due to variations in weather, temperature, etc. Thus, although the detected measurement of barometric pressure at an individual's smartphone can rise or fall as the individual increases or decreases in vertical distance, that single data point by itself does not necessarily provide a concrete or absolute indication of vertical height (e.g., because the same measurement might indicate two significantly different vertical heights depending on how the weather and overall atmospheric pressure is changed). To address this complication, certain vendors can provide one or more barometric pressure sensors, such as barometric pressure sensor 602 shown in FIG. 6, which is constantly fixed at any known vertical height. Accordingly, emergency response technologies of this application can leverage the known vertical height of barometric pressure sensor 602 to thereby intelligently correlate the measurements that that particular sensor, at any known time of day, detected measurements from barometric pressure sensors within instances of user equipment, such as smartphones, thereby revealing a true or absolute vertical height at that particular time of day, consistent with the discussion above.

Figure 7:
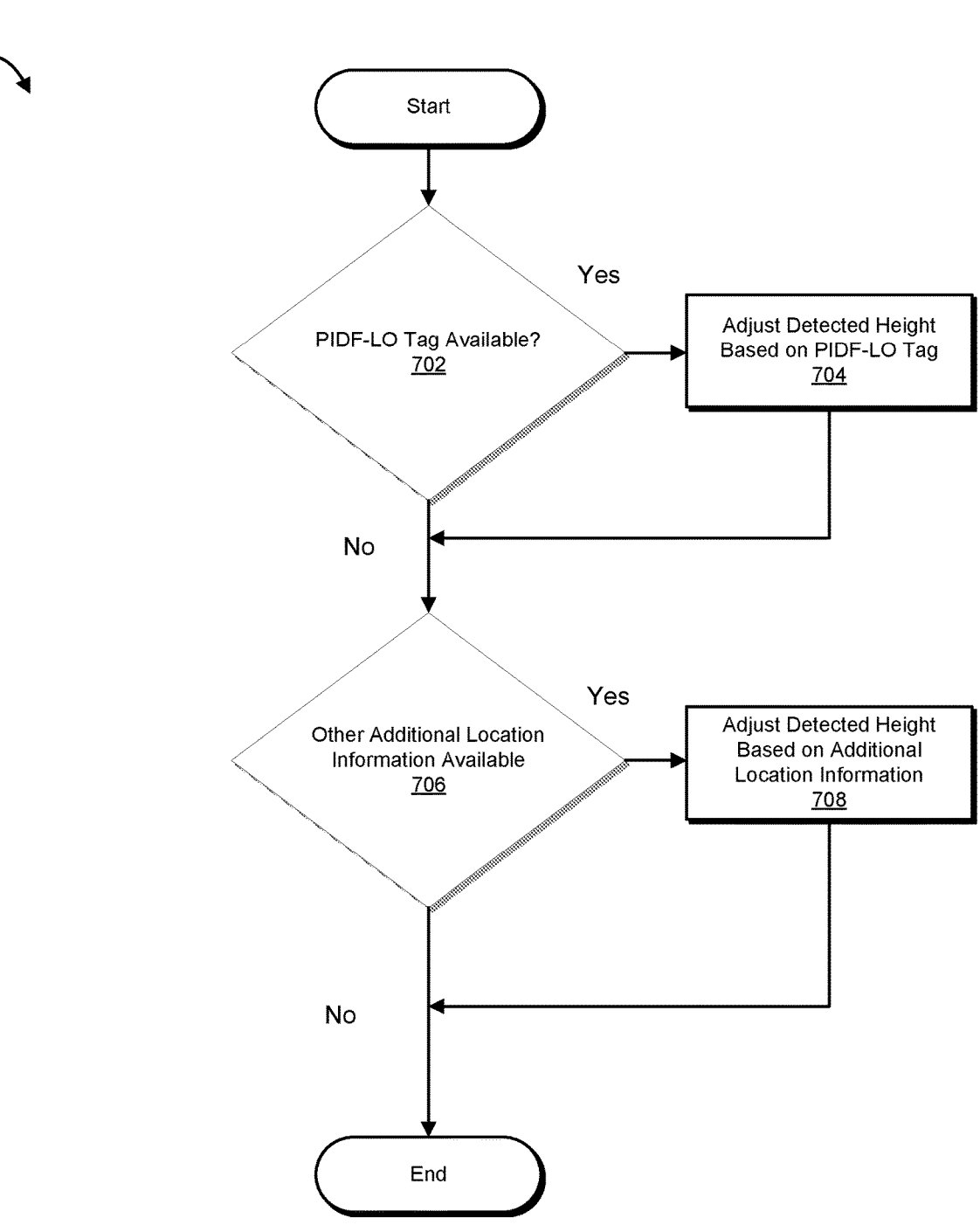
FIG. 7 shows another flow diagram for an example method for emergency response location crowdsourcing.

Just as the detected vertical height for a particular item of user equipment can be improved by leveraging the detected vertical height for one or more other instances of user equipment within the same network vicinity, as discussed above, the detected vertical height can also be improved by leveraging or applying other items of relevant data. FIG. 7 shows an example flow diagram for a method 700 that may facilitate the performance of method by enhancing the accuracy of location detection using one or more items of additional information, as further discussed below.

Method 700 may begin at a decision step 702, at which point one or more of the systems described herein may check whether a PIDF-LO tag is available to further indicate location information, including potentially vertical height location information. As understood by those having skill in the art, the PIDF-LO (Presence Information Data Format-Location Object) tag provides a flexible and versatile means to represent location information. Newer model wireless routers, including those configured for Wi-Fi 6, may potentially be configured to enable usage of the PIDF-LO tag mechanism. If this mechanism is available, then the detected height may be adjusted based on the information contained within this particular tag at step 704 of method 700.

Subsequently, at decision step 706, one or more of the systems described herein may check whether any other items of additional location information are available, which can be used to supplement or enhance the detection of the vertical height consistent with method 100, as further discussed above. Such items of information may include sonar information, radar information, any one or more of various forms of wired or wireless network location information, and/or wireless triangulation information, etc. If one or more of these items of information are available, then the detected height may be adjusted accordingly at step 708. Subsequently, method 700 may end.

Figure 8:
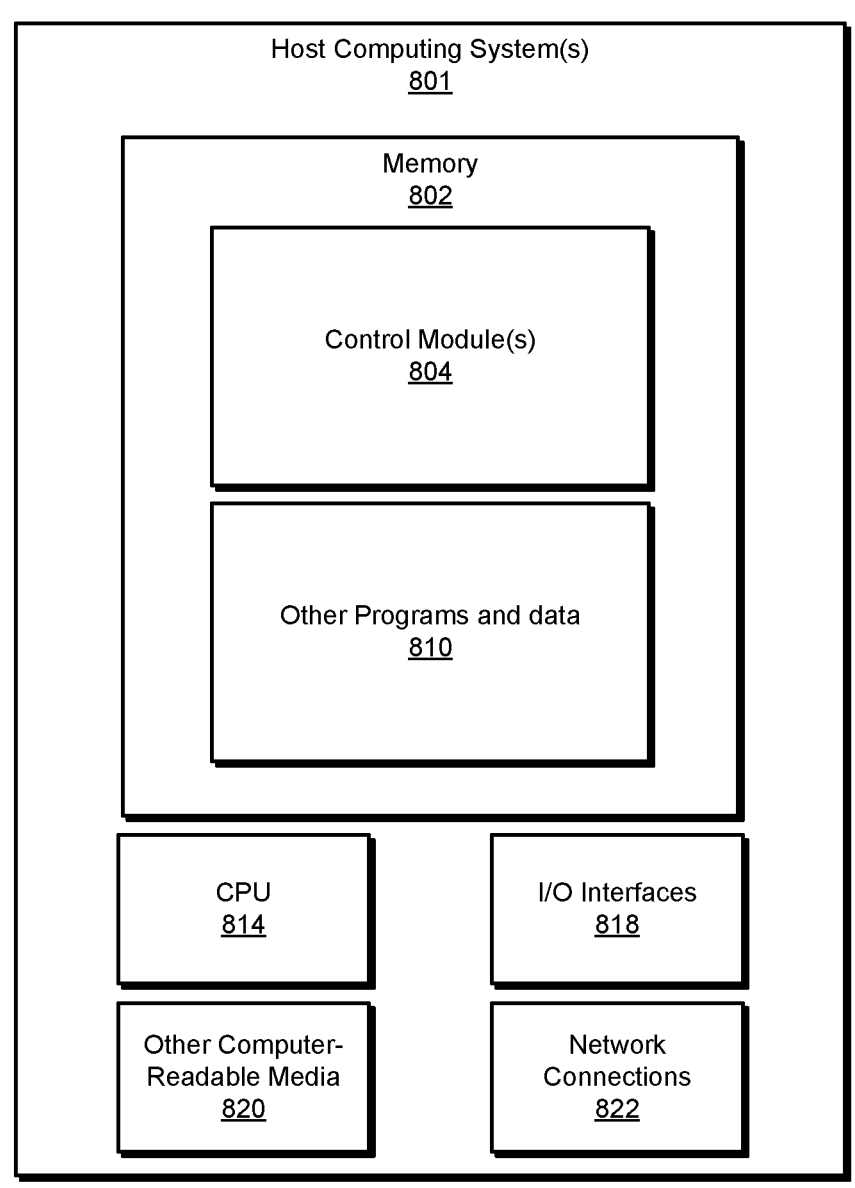
FIG. 8 shows an example computing system that may facilitate the performance of one or more of the methods described herein.

FIG. 8 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 8 illustrates an example of underlying hardware on which such software and functionality may be hosted and/or implemented.

In particular, shown is example host computing system(s) 801. For example, such host computing system(s) 801 may execute a scripting application, or other software application, to perform method 100, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computing system(s) 801 may include memory 802, one or more central processing units (CPUs) 814, I/O interfaces 818, other computer-readable media 820, and network connections 822.

Memory 802 may include one or more various types of non-volatile and/or volatile storage technologies. Examples of memory 802 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 802 may be utilized to store information, including computer-readable instructions that are utilized by CPU 814 to perform actions, including those of embodiments described herein.

Memory 802 may have stored thereon control module(s) 804. The control module(s) 804 may be configured to implement and/or perform some or all of the functions of the systems or components described herein. Memory 802 may also store other programs and data 810, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 822 are configured to communicate with other computing devices to facilitate the functionality described herein. In various embodiments, the network connections 822 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 818 may include a video interface, other data input or output interfaces, or the like. Other computer-readable media 820 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   detecting, from a first sensor at a first user equipment, a vertical height of the first user equipment;
   detecting, from the first user equipment, a request for emergency services directed to an emergency response service;
   detecting an indication that a second user equipment is located within a network vicinity of the first user equipment; and
   improving an accuracy of detecting the vertical height of the first user equipment by adjusting the detected vertical height of the first user equipment based on a detected vertical height from a second sensor at the second user equipment;
   wherein:
   detecting the indication that the second user equipment is located within the network vicinity of the first user equipment comprises detecting that the first user equipment and the second user equipment are connected to a same Wi-Fi network access point.

2. The method of claim 1, wherein the first sensor comprises a barometric pressure sensor.

3. The method of claim 2, wherein the barometric pressure sensor indicates the vertical height of the first user equipment based on correlating an output of the barometric pressure sensor with output of a third-party barometric sensor at a predetermined vertical height.

4. The method of claim 1, wherein improving the accuracy based on the detected vertical height of the second user equipment is performed in response to the request for emergency services directed to the emergency response service.

5. The method of claim 1, wherein the accuracy is further improved by adjusting the detected vertical height of the first user equipment based on a detected vertical height from a third sensor at a third user equipment.

6. The method of claim 1, wherein detecting the indication that the second user equipment is located within the network vicinity of the first user equipment comprises detecting that the first user equipment and the second user equipment can directly reach each other over a wireless connection.

7. The method of claim 1, further comprising receiving the detected vertical height of the first user equipment in response to the request for emergency services directed to the emergency response service.

8. The method of claim 1, further comprising crowdsourcing a multitude of detected vertical heights from different instances of user equipment by aggregating them at a backend server of a cellular service provider.

9. The method of claim 1, wherein the accuracy is further improved by adjusting the detected vertical height of the first user equipment based on a value in a Presence Information Data Format-Location Object (PIDF-LO) tag provided by the same Wi-Fi network access point.

10. A system comprising:
   at least one processor; and
   at least one memory coupled to the at least one processor, the at least one memory having computer-executable instructions stored thereon that, when executed by the at least one processor, cause actions to be performed, the actions including:
   detecting, from a first sensor at a first user equipment, a vertical height of the first user equipment;
   detecting, from the first user equipment, a request for emergency services directed to an emergency response service;
   detecting an indication that a second user equipment is located within a network vicinity of the first user equipment; and
   improving an accuracy of detecting the vertical height of the first user equipment by adjusting the detected vertical height of the first user equipment based on a detected vertical height from a second sensor at the second user equipment:
   wherein:
   detecting the indication that the second user equipment is located within the network vicinity of the first user equipment comprises detecting that the first user equipment and the second user equipment are connected to a same Wi-Fi network access point.

11. The system of claim 10, wherein the first sensor comprises a barometric pressure sensor.

12. The system of claim 11, wherein the barometric pressure sensor indicates the vertical height of the first user equipment based on correlating an output of the barometric pressure sensor with output of a third-party barometric sensor at a predetermined vertical height.

13. The system of claim 10, wherein the system is configured to improve the accuracy based on the detected vertical height of the second user equipment in a manner that enables measurement of the vertical height to satisfy a safety mandate.

14. The system of claim 10, wherein the system is configured to further improve the accuracy by adjusting the detected vertical height of the first user equipment based on a detected vertical height from a third sensor at a third user equipment.

15. The system of claim 10, wherein detecting the indication that the second user equipment is located within the network vicinity of the first user equipment comprises detecting that the first user equipment and the second user equipment can directly reach each other over a wireless connection.

16. The system of claim 10, wherein the system is further configured to receive the detected vertical height of the first user equipment in response to the request for emergency services directed to the emergency response service.

17. The system of claim 10, wherein the system is further configured to crowdsource a multitude of detected vertical heights from different instances of user equipment by aggre- ⁵ gating them at a backend server of a cellular service provider.

18. A non-transitory computer-readable medium encoding instructions that, when executed by at least one physical processor of a computing device, cause the computing ¹⁰ device to perform a method comprising:

detecting, from a first sensor at a first user equipment, a vertical height of the first user equipment;

detecting, from the first user equipment, a request for emergency services directed to an emergency response ¹⁵ service;

detecting an indication that a second user equipment is located within a network vicinity of the first user equipment; and improving an accuracy of detecting the vertical height of ²⁰ the first user equipment by adjusting the detected vertical height of the first user equipment based on a detected vertical height from a second sensor at the second user equipment;

wherein: ²⁵ detecting the indication that the second user equipment is located within the network vicinity of the first user equipment comprises detecting that the first user equipment and the second user equipment are connected to a same Wi-Fi network access point. ³⁰

\* \* \* \* \*